United States Patent [19]

Herchenroeder et al.

[11] Patent Number: 4,965,053
[45] Date of Patent: Oct. 23, 1990

[54] ION EXCHANGE PURIFICATION OF SCANDIUM

[75] Inventors: Laurie A. Herchenroeder, Noblesville, Ind.; Harvey R. Burkholder, Ames, Iowa

[73] Assignee: Iowa State University Research Foundation, Inc., Ames, Iowa

[21] Appl. No.: 310,044

[22] Filed: Feb. 10, 1989

[51] Int. Cl.$^5$ .................. C01F 17/00; C22B 59/00
[52] U.S. Cl. .......................... 423/21.5; 423/263; 210/672; 210/688; 210/685
[58] Field of Search .................. 210/688, 672, 685; 423/21.5, DIG. 14, 263; 75/101 BE

[56] References Cited

U.S. PATENT DOCUMENTS

| | | | |
|---|---|---|---|
| 2,897,050 | 7/1959 | Jaffe | 423/21.5 |
| 2,956,858 | 10/1960 | Spedding | 423/21.5 |
| 3,037,841 | 6/1962 | Krumholz | 423/21.5 |
| 3,192,012 | 6/1965 | Rice | 423/21.5 |
| 3,259,472 | 7/1966 | Rice | 423/21.5 |
| 3,275,404 | 9/1966 | Firsching | 423/21.1 |
| 3,455,646 | 7/1969 | Morton | 423/21.5 |
| 3,857,919 | 12/1974 | Hazen et al. | 423/9 |
| 4,411,793 | 10/1983 | Kato et al. | 210/656 |
| 4,599,175 | 7/1986 | Yamamizu et al. | 210/635 |
| 4,624,703 | 11/1986 | Vanderpool et al. | 423/146 |
| 4,718,995 | 1/1988 | Vanderpool et al. | 204/112 |
| 4,718,996 | 1/1988 | Vanderpool | 75/101 BE |
| 4,816,233 | 3/1989 | Rourke et al. | 210/688 |

OTHER PUBLICATIONS

Lo Teh. C. *Handbook of Solvent Extraction* 1984, John Wiley & Sons, N.Y. pp. 170–174.

Horovitz; C. T., Gschneider, Jr.; K. A., Melson; G. A., Youngblood; D. H., Schock; H. H., *Scandium*, 1975 Academic Press, London, pp. 392–398.

*Primary Examiner*—John Doll
*Assistant Examiner*—Steven J. Bos
*Attorney, Agent, or Firm*—Zarley McKee, Thomte, Voorhees & Sease

[57] ABSTRACT

An improvement in purification of scandium through ion exchange chromatography is disclosed in which the oxidation potential of the eluting solution is altered by the addition of potassium chlorate or ammonium chloride so that removal of contaminants is encouraged. The temperature, pH and concentration of the eluent HEDTA are controlled in order to maintain the scandium in the column while minimizing dilution of the scandium band. Recovery of scandium is improved by pumping dilute scandium over the column prior to stripping the scandium and precipitation. This eliminates the HEDTA ion and other monovalent cations contaminating the scandium band. This method maximizes recovery of scandium while maintaining purity.

13 Claims, 1 Drawing Sheet

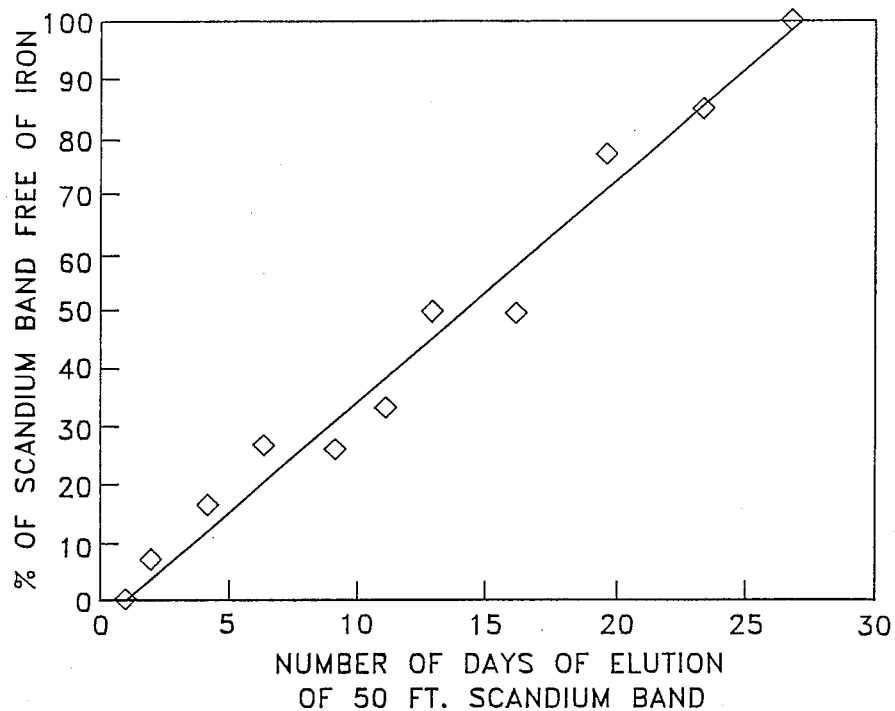
FIG_1
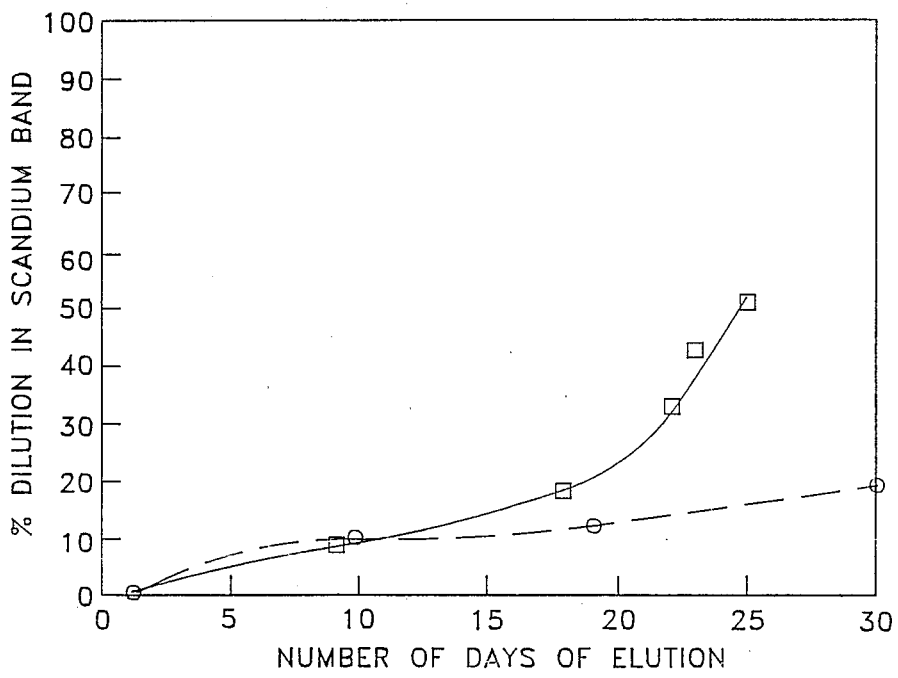
FIG_2
——□—— RUN 11 94C pH 7.4
——○—— RUN 12 82C pH 7.9

ION EXCHANGE PURIFICATION OF SCANDIUM

GOVERNMENT RIGHTS

This invention was made with government support under contract number W-7405-ENG-82 by the Department of Energy. The Government has certain rights in the invention.

BACKGROUND OF THE INVENTION

Ion exchange chromatography is a useful process in the separation and purification of certain rare earth metals. The process relies on the ability of a column packed with ion-exchange resin to absorb ions of the metal to be separated and purified, and upon the ion exchange which occurs between an eluent passed over the resin and the ions of the metals, which are desorbed and absorbed in order to separate and purify the various metals. Chelate agents are often employed in the separation and purification since the chelate complexes with metals having greater stability (such as heavier rare earths) and they desorb to a greater extent, while those elements having a less stabile complex with the chelate will desorb to a less extent, typically at the end of the band of elements since they do not have to compete with the other stronger complexing elements.

When applied to the purification of scandium, ion exchange chromatography involves packing a column with resin and the solution containing the scandium is passed over the resin. The eluent is then passed over the resin and a band of scandium spreads forward on the column. The amount of scandium at the front of the band is small at first, and then increases, so that a bell-shaped curve of recovery of scandium occurs. At the front of the band there are usually contaminants, such as iron, nickel or copper, and at the back of the band calcium and magnesium, for example, may bleed into the scandium concentrations. When the band reaches the point that the purified scandium has been eluted, the run is stopped, and the scandium stripped from the resin. Scandium is then precipitated from the strip solution. With this conventional ion exchange process, a loss of 10–50% of the processed scandium is not unusual.

The problems with this process include the contamination that occurs in the scandium band. While a chelating agent is useful as the eluent, it contaminates the scandium band. Other metals may also contaminate the band and scandium may be lost in the eluent.

Accordingly, it is an object of this invention to provide high yield recovery of scandium in ion exchange chromatography, while maintaining the purity of the scandium.

It is another object of this invention to decrease contamination of the recovered scandium from ion exchange chromatography.

A further object of the invention is to provide a method of ion exchange purification of scandium which alters the oxidation potential of the eluting solution in order to remove contaminants.

Another object of the invention is to provide for altering the oxidation potential of the eluting solution in ion exchange purification of scandium by the addition of potassium chlorate and ammonium chloride.

A further object of the invention is to maintain scandium on the column resin in ion exchange purification of scandium.

Another object of the invention is to prevent dilution of the scandium band on the column exchange resin.

A still further object of the invention is to promote retention of scandium on the column resin and minimize dilution of the scandium by controlling the temperature, pH and concentration of the eluting solution.

A further object of the invention is to eliminate contamination caused by the eluent.

Yet another object of the invention is to provide for a secondary separation of monovalent cations in the column resin.

An even further object of the invention is to improve recovery of scandium by pumping dilute scandium over the eluted scandium resin column.

SUMMARY OF THE INVENTION

The invention relates to the elimination of contaminants in the eluting solution in ion exchange purification of scandium. This is done by altering the oxidation potential of the eluting solution by addition of potassium chlorate and ammonium chloride. The invention further provides for minimizing dilution of the scandium band by controlling the temperature, pH and concentration of the eluting solution hydroxyethylenediaminetriacetic (HEDTA). Further, contamination caused by the eluent and separation of monovalent cations contaminating the scandium band may be avoided by pumping dilute scandium over the scandium band on the resin after it has been purified.

BRIEF DESCRIPTION OF THE DRAWING

FIG. 1 is a graph depicting the amount of scandium free of iron recovered when the oxidation potential of the eluent is altered.

FIG. 2 is a graph showing varying dilution of the scandium band when the pH and temperature are altered.

DETAILED DESCRIPTION OF THE PREFERRED EMBODIMENT

The process of this invention generally comprises elimination of contaminants through adding certain salts to the eluent, controlling the temperature, pH and concentration of the eluent, and finally pumping dilute scandium solutions over the column prior to stripping the scandium off of the column.

The type of cation exchange resin employed is not critical for this process, and any such resin would be suitable. Types of resins which have been employed include sulfonated resinous condensates of phenol and formaldehyde and nuclear sulfonic acid aromatic-type resins. The resin is packed into a suitable column and the solution containing the scandium ions in salt form is passed through this column to absorb the scandium ions onto the resin.

This invention provides for elimination of contaminants in the process by altering the oxidation potential of the eluting solution. In this process, potassium chlorate and ammonium chloride are added to the eluent. It is necessary to add only a very small amount of the salt to the eluent, up to 0.1 of a gram per liter of the eluent solution. As little as 0.05 grams per liter can be effective. In fact, smaller amounts are also effective, but at a very slow rate. Adding more than 0.1 of a gram per liter will possibly interfere with the results. These results may be used with any separation of this type and may be applied to chelating agent eluents such as ethylenediaminetetraacetic acid (EDTA), N-hydroxyethylethylenediaminetriacetic acid (HEDTA), nitryl triacetic acid (NTA), or citric acid. The worst problem with contamination usually comes from iron, since ferric or ferrous irons are nearly always present in eluents of HEDTA and EDTA, for example. The ferric iron is eluted near the front of most mixtures, while the ferrous iron elutes with calcium near the back. Chelation with HEDTA promotes oxidation to the ferric ion, while the ion exchange resin promotes reduction to the ferrous ion. Therefore, the scandium band nearly always contains a low level equilibrium amount of iron. When the potassium chloride or ammonium chloride is added, it will maintain the ion as the ferric ion. Therefore, the iron elutes more readily since it is in the ferric ion form. While iron is one of the most problematic contaminants, this process will assist in removal of any metallic cation which has the ability to have a different oxidation state. Tin is another example of the type of contaminant which may be eliminated. With this method, the purity of scandium is improved since the contaminants are removed.

When the eluent used is HEDTA, controlling the pH, temperature, and concentration assists in maintaining scandium on the column resin while at the same time minimizing dilution of the band.

The solution of HEDTA may consist of distilled pure water, with the HEDTA having up to five grams per liter concentration in the solution. The temperature of the eluent may range from 80° C. to 95° C., and a temperature of 82° C. is most preferred. The eluent may be warmed by any acceptable method, and one method employed here is by maintaining the ambient temperature within the range desired, and placing the eluent in a tube where it is warmed slowly by the increased room temperature. Because of the higher temperature, there is an increased tendency for dissolved gas in the eluent to form bubbles. When the temperature is below 80° C., scandium is not retained and would be lost into the solution. At temperatures higher than 95° C., the band of scandium is rapidly diluted with the HEDTA species. It is necessary to degas the eluent, and one way which this may be accomplished is by passing the eluent into a heated resin column where it is degassed following the slow warming.

The range of pH of the eluent should be kept between 7.4 and 7.9, with the pH of 7.9 being the most preferred for best retention of scandium while preventing dilution. Any acceptable method of adjusting the pH may be employed. Adjusting the pH with a base requires that the base must be one which will not impart impurities into the solution. Examples of acceptable bases include ammonium hydroxide and sodium hydroxide. Ammonium hydroxide is preferable because it can be prepared from a gas, so there are no other impurities, and because ammonium is innocuous and easily eliminated.

The concentration of HEDTA is most effective in retaining scandium while preventing dilution of the band where it is up to 5 grams per liter concentration. As little as 1 gram per liter or even less is effective but works slowly. The preferred concentration is 5 grams per liter.

As the eluent passes through the column, the band of scandium develops and moves forward, ordinarily having contaminants at the front and the back of the band. If, for example, the band was 10 columns long, scandium at the front, the first column, would contain the typical contaminants such as iron, nickel, and copper. At the back of the band, the last column would contain those elements which elute slower, as for example, calcium and magnesium. The middle eight purified columns would also have contaminants of HEDTA species as well as potassium from the salt added to the eluent, described above. At this point, the run would be stopped and these columns containing the high amounts of scandium stripped and the scandium precipitated from the strip solution. Under the preferred method of this invention, however, when the run is stopped, a dilute solution of scandium is passed through the column prior to stripping and precipitation. It has been found that by passing this dilute scandium through the columns, the contaminants are displaced, while the scandium itself is retained. Therefore, the HEDTA species and the potassium which was earlier added to the eluent are removed.

The dilute scandium would include a solution of distilled water with scandium of from 0.5 gram per liter to about 5.0 grams per liter. If less than this concentration of scandium is in the solution, the process works too slowly. At above 5.0 grams per liter, the scandium itself will be moved. Most preferred is about 2.0 grams per liter of concentration of scandium in the solution. It is also preferred that some acid be included in the solution so that hydroxide will not form. Application of an acid to such eluent solution is generally known in the art, and an example of what would be acceptable includes nitric acid added to reach a pH of 2.

The process would then follow the well known procedures of stripping the scandium from the column. The stripping solution must be one which will not add contaminants, and which will dissipate upon heating. It also must be a solution which is capable of driving the stripping action, since scandium is a trivalent ion and adheres more readily than a monovalent cation to the complex. Further, the solution must be a soluble species. Examples include nitric acid and hydrochloric acid, but the most preferable is ammonium acetate. It is not as corrosive and difficult to handle as nitric acid and has all of the other desirable properties. Stripping the scandium may be accomplished, for example, with one M-ammonium acetate solution at a pH of 6.5.

Scandium in the strip solution is then precipitated. The precipitant must be highly insoluble so that scandium is recovered and not lost. Further, it must oxidize easily, so that it disappears in firing. Examples of acceptable precipitants are sodium hydroxide and fluoride. The most preferred is oxalic acid, as it does not contribute impurities and scandium oxalate is an easy to filter precipitate.

The following examples are offered to illustrate but not limit the process of the invention.

EXAMPLES 10 columns were set up of Pyrex flange glasspipe filled with teflon bed supports, plexiglass end pieces, kel-f, and glass and viton connections between the columns. The columns were packed with DOWEX50X8, 40/50 mesh resin. Temperature in the ambient atmosphere was varied from one run at 94° C. to 82° C. in another.

A scandium nitrate solution obtained by dissolving scandium oxide in nitric acid was passed through the column. The eluent was an HEDTA solution of 4 grams per liter which was degassed continuously. Potassium chlorate in the amount of 0.1 gram per liter and ammonium chloride in the amount of 0.1 gram per liter were added to the eluent. The eluent pH was controlled with Cole Parmer pH controller and in the first run was at 7.4 and was at 7.9 in the second run. Flowrate was maintained at about 2 ml/cm². After the band advanced so that the middle eight columns contained essentially pure scandium, dilute scandium solution of 2 grams per liter in distilled water was passed through the columns.

FIG. 1 demonstrates the amount of scandium recovered which was free of iron when potassium chlorate and ammonium chloride was added to HEDTA eluent. In FIG. 2, results are shown of the amount of dilution in the scandium band in a first run where four grams per liter of HEDTA solution at 94° C. and a pH of 7.4 was passed through the column. In the second run, the HEDTA was maintained at 82° C. and a pH of 7.9 demonstrating improvement in avoiding dilution of the scandium band.

Dilute scandium passed through the column prior to stripping with one M-ammonium acetate solution at a pH of 6.5 and precipitation with oxalic acid is demonstrated in the table below. Recovery of scandium was improved by a factor approximately 1.6 per column with the dilute scandium passage.

TABLE

| | Comparison of Scandium Oxide Yield | |
|---|---|---|
| Column Number | $Sc_2O_3$ Recovered without Pre-Elution (g) | $Sc_2O_3$ Recovered with Pre-Elution (g) |
| 21 | 630 | 1035 |
| 22 | 689 | 1120 |
| 23 | 839 | 1294 |
| 24 | 690 | 1122 |
| 13 | 592 | 1058 |
| 14 | 658 | 813 |
| 15 | 687 | 1009 |
| 10 | 702 | 1142 |
| 11 | 715 | 1172 |
| 12 | 634 | 1063 |

Thus it can be seen from the foregoing that the invention accomplishes at least all of its objectives.

What is claimed is:

1. A method of ion exchange purification of scandium comprising:

contacting a solution containing scandium with a cation exchange resin;

eluting said scandium with a solution comprising up to 5.0 grams per liter of HEDTA which may have potentially interfering metallic cations, and to which is added a small but metallic cation oxidation potential increasing effective amount of a compound selected from the group consisting essentially of potassium chlorate and ammonium chloride, at a temperature of from about 80° C. to about 95° C. and a pH of from about 7.4 to about 7.9; and contacting a dilute solution of scandium with said resin.

2. The method of claim 1 wherein said potassium chlorate and ammonium chloride are added at levels up to about 0.1 grams per liter of the eluent.

3. The method of claim 1 wherein said temperature is 82° C.

4. The method of claim 1 wherein said pH is 7.9.

5. The method of claim 1 wherein said pH is adjusted by addition to the HEDTA solution of a base which will not add impurities to said solution.

6. The method of claim 5 wherein said base is ammonium hydroxide.

7. The method of claim 1 wherein said dilute solution of scandium is from about 0.5 grams per liter of scandium to about 5.0 grams per liter of scandium.

8. The method of claim 7 wherein said dilute solution of scandium is about 2.0 grams per liter of scandium.

9. The method of claim 8 wherein contacting said dilute solution of scandium with said resin is followed by contacting said resin with a stripping solution which removes said scandium without adding undesirable elements and which dissipates upon heating.

10. The method of claim 9 wherein said stripping solution used is ammonium acetate.

11. The method of claim 9 wherein said scandium removed with said stripping solution is precipitated with an insoluble precipitant solution capable of being oxidized.

12. The method of claim 11 wherein said precipitant used is oxalic acid.

13. The method of claim 1 wherein said temperature is 82° C. and said pH is 7.9.

* * * * *